United States Patent
Park et al.

(10) Patent No.: US 6,569,279 B1
(45) Date of Patent: May 27, 2003

(54) METHOD FOR BONDING COMPOSITE WOOD PRODUCTS

(75) Inventors: David W. Park, Puyallup, WA (US); Richard E. Wagner, Auburn, WA (US); Ronald C. Wilderman, Sumner, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/562,362

(22) Filed: May 1, 2000

(51) Int. Cl.⁷ ............................................. B32B 31/20
(52) U.S. Cl. .................. 156/273.3; 156/326; 156/331.4
(58) Field of Search ....................... 106/287.25; 522/63, 522/70, 68; 156/326, 273.7, 331.4; 524/280

(56) References Cited

U.S. PATENT DOCUMENTS

| | | | | |
|---|---|---|---|---|
| 2,434,573 A | * | 1/1948 | Mann et al. | 156/273.7 |
| 3,021,248 A | * | 2/1962 | Mann et al. | 156/273.7 |
| 4,344,798 A | | 8/1982 | Gaul et al. | |
| 4,359,507 A | * | 11/1982 | Gaul et al. | 156/326 |
| 4,414,361 A | * | 11/1983 | Gaul et al. | 156/326 |
| 4,833,036 A | * | 5/1989 | Cannarsa et al. | 524/280 |
| 5,140,086 A | | 8/1992 | Hunter et al. | |
| 5,580,922 A | | 12/1996 | Park et al. | |
| 5,584,958 A | * | 12/1996 | Gillis et al. | 156/331.4 |
| 6,105,321 A | * | 8/2000 | KarisAllen et al. | 428/114 |
| 6,231,985 B1 | * | 5/2001 | Chen et al. | 156/331.4 |

FOREIGN PATENT DOCUMENTS

JP  62-115076  * 5/1987 ............. 156/331.4

OTHER PUBLICATIONS

Vick, Charles B. Lamination of hardwood composite framig with an emulsion polymer–isocyanate adhesive and radio frequency curing. Forest Service, Southeastern Forest Experiment Station, Research Paper SE–262 (1987).

* cited by examiner

Primary Examiner—Jeff H. Aftergut
Assistant Examiner—John T. Haran

(57) ABSTRACT

A method for bonding composite wood products comprises using a PMDI adhesive modified with a polar compound such as a lower alkylene carbonate or triacetin with a combination of conductive thermal heat and radio frequency energy. Propylene carbonate is a preferred modifier. Press temperatures and pressing times may be significantly reduced from those using either unmodified PMDI adhesives or the modified adhesives without radio frequency energy. Laminated veneer products 38 mm in thickness can be pressed at 110°–120° C. in as little as 7 minutes using radio frequency energy at a level of about 32 kw/m².

21 Claims, 1 Drawing Sheet

METHOD FOR BONDING COMPOSITE WOOD PRODUCTS

The present invention relates to an improved method of bonding composite wood products using an adhesive mixture of a diisocyanate modified with an alkylene carbonate or triacetin. Significantly reduced press times and/or temperatures and improved product quality are achieved by the use of both thermal and radio frequency energy while pressing to cure the adhesive and produce the products

BACKGROUND OF THE INVENTION

Composite wood products bonded with durable adhesives have been known for many years. These include well known materials such as particle board, flake board, and oriented strand board made from comminuted wood. They also include products such as plywood, laminated veneer lumber, laminated beams, and lumber reformed from thick veneers or sawn strips. All share the property that an intermediate form of wood; e.g., sawn boards, veneer or particles, are bonded with an adhesive, most typically a thermosetting adhesive, under heat and pressure to form a desired product configuration. Some more massive products, such as laminated beams, use room temperature setting adhesives since heat transfer into the interior is very slow and enormously long press cycles would otherwise be required.

In most plants making reconstituted wood products, the press is the most expensive piece of equipment. This is usually a massive hydraulic press that may have multiple openings for simultaneously pressing a plurality of panels. Alternatively, the press may be a continuous type in which the product is carried between moving steel belts. Presses are most usually heated internally with steam or hot oil. The products are held under heat and pressure until the heat has time to transfer to the center of the cross section and cure the bonding adhesive. In some instances the adhesive coated wood is preheated with microwave energy before entering the press. Unless very carefully controlled this can cause precure of the adhesive resulting in poor bonding. The press cycle acts as a bottleneck to limit production rate of the plant. Any way in which the cycle can be shortened can usually increase plant productivity with no or minimal additional capital investment.

The adhesives used for reconstituted wood products were for many years limited to heat cured thermosetting condensation resins; e.g., urea-formaldehyde, melamine-urea-formaldehyde, or phenol-formaldehyde types. Phenol-resorcinol-formaldehyde resins were and still are widely used for room temperature setting applications. With the exception of the urea based types, these resins give a water resistant bond that enable the products to be used in wet environments. More recently, isocyanate based adhesives have come into use. Most usually these are based on mixtures of diphenylmethane diisocyanate monomers and its oligomers, usually referred to as PMDI resins. The PMDI resins depend on ambient moisture and heat to cure to crosslinked polyureas. Products made from these resins also exhibit good water resistance.

While most reconstituted wood products use conductive thermal heat for curing the adhesives, some systems have used radio frequency (RF) energy in place of or to supplement conventional heating. Radio frequency energy has been commonly used for bonding finger joints in lumber products and for edge gluing narrower strips into wider pieces for furniture panels. It has also been recently used as a supplemental heat source in the manufacture of laminated veneer lumber, in redrying veneers having moisture content above specifications, and in the manufacture of laminated structural members.

Laminated veneer lumber has been in commercial production and use for a number of years, often as the tension member in trusses; e.g., as seen in Troutner, U.S. Pat. No. 3,813,842. It has the advantage that defects, particularly knots, do not run completely through the piece as they frequently do in solid sawn lumber. Laminated veneer lumber is normally laid up in panel form and ripped to the desired width after pressing. Bassett et al., in U.S. Pat. No. 6,001,452, describe lumber products made by selectively placing and adhesively bonding wood from the outer (and stronger) portion of the logs on the edge portions of their product.

PMDI adhesives are routinely used for manufacture of the flake boards now widely used in place of plywood for residential and commercial construction. These adhesives have not found as much use in bonding wood products such as laminated veneer lumber or plywood, however. Relatively high press temperatures must be used to bring cure times to economic levels. These temperatures frequently cause steam "blows" or blisters in the product if the pressure is released rapidly. The gradual pressure release time thus required significantly extends the effective pressing cycle. Further, the high heat required can darken the wood and deleteriously affect appearance.

Gaul et al., in U.S. Pat. Nos. 4,344,798, 4,359,507, and 4,414,361, describe PMDI compositions modified with liquid esters of carbonic acid, particularly ethylene, propylene, or butylene carbonates, for bonding composite wood products. The modified compositions are said to reduce cost and viscosity of the resin so that it may be applied to wood particles using conventional equipment.

Hunter et al, in U.S. Pat. No. 5,140,086, show the use of propylene carbonate modified PMDI as an impregnant for cellulose sheets. Park et al., in U.S. Pat. No. 5,580,922, show a similar use of PMDI modified with up to about 20% triethyl citrate or triacetin.

An article by Vick in U. S. Forest Service, Southeastern Forest Research Experiment Station Research Paper SE-262 (1987) teaches the application of prelaminated veneer strips to the edges of construction lumber using emulsion-type urethane adhesives cured with the application of RF energy. However, the art appears to have ignored the possibility and advantages of using RF energy to cure composite wood products using PMDI or modified PMDI adhesives. One reason for this is believed to be the low polarity of PMDI resin molecules which results in a low acceptance of radio frequency energy. However, the present inventors have found that the use of PMDI resins modified to increase their polarity can be effectively cured by radio frequency energy. The present invention is directed to the use of these modified resins with radio frequency energy being applied during the pressing cycle of composite wood materials.

SUMMARY OF THE INVENTION

The invention is directed to the formation of composite wood products bonded with polyfunctional isocyanate adhesives that have been modified with compatible materials to increase their polarity and susceptibility to radio frequency energy. Modifiers should be mutually soluble in the isocyanate and water. The wood may be provided in the form of particles, flakes, strands or splinters, veneers, or sawn wood strips. The adhesive is preferably based on diphenylmethane diisocyanate which may be in monomeric form or mixed with oligomers of this and other materials and is generally referred to as PMDI. However, the adhesives may be selected from other lower aliphatic, alicyclic, or aromatic polyfunctional isocyanates. The modifiers are selected from the group of lower alkylene carbonates and/or triacetin. The preferred modifiers are ethylene, propylene or butylene carbonate. Of these propylene carbonate is the most preferred. From about 5–25% of the modifier is used, based on the weight of the isocyanate adhesive. A more preferred range is about 10–20% modifier.

In the practice of the method the wood particles are first at least partially coated with the above adhesive mixture. They are then formed into a preform such as a mat, multi-ply veneer layup, or other configuration suitable for application of heat and pressure to bond the assembly and form an intermediate or final product configuration. The preform is then subjected to predetermined pressure while both conductive thermal heat and radio frequency energy (RF) are applied. The thermal energy would typically be supplied from press platens heated to a given temperature with steam or oil. It is not essential that the radio frequency energy be applied through the entire pressing cycle. The term "radio frequency heating" should be considered sufficiently broadly to include both conventional dielectric heating frequencies in the 2 MHz to 200 MHz range and higher frequencies generally considered to be in the microwave range of about 900 MHz to 2400 MHz. Sufficient radio frequency energy is used so that the press cycle to achieve a handleable product is reduced to no more than about 80% of the time required when thermal energy alone is applied at the given platen temperature. Preferably the time is reduced to less than 70% and most preferably to less than 50% of the time required by the use of conductive heat alone at a given temperature.

By "handleable product" is meant one which may be subjected to normal post pressing handling, such as might occur during a plant production operation, without external or internal damage or debonding.

Using the modified adhesive with radio frequency energy during pressing, the press temperature required may be significantly reduced below that required for unmodified isocyanate. Temperatures in the range of 100–140° C., preferably about 110–130° C., are preferred. Press platen temperatures should be at least sufficient so that they will not act as a cold sink to withdraw heat from the preform during the application of radio frequency energy. They should also be sufficiently high to begin vaporization of any water contained within the wood particles since this water is essential to begin the polymerization of the isocyanate to polyurea compounds. The combination of the modified adhesives with radio frequency energy allows lower platen temperatures to be used. Among other advantages, this reduces surface scorching or discoloration of the pressed articles.

At a press platen temperature of 120° C. a 25 ply parallel laminated veneer product about 38 mm (1½ inches) thick has been cured in about 6 minutes by application of additional radio frequency energy at a level of about 32 kw/m$^2$ (3 kw/ft$^2$).

The ratio of radio frequency energy to conductive thermal energy will be variable and will depend on many factors. These include the specific equipment available and the configuration and nature of the products being formed. If the products are relatively thin, the ratio of radio frequency to conductive energy might be fairly low. For thicker products the ratio will preferably be considerably higher. At least about 10% of the energy supplied to the preform during pressing will be radio frequency energy. Most preferably the radio frequency energy will be in the range of 50–90% of the total energy input.

It is an object of the present invention to provide a method by which composite wood products may be rapidly bonded using isocyanate adhesives and a combination of conductive heat and radio frequency energy.

It is another object to provide modified isocyanate adhesives of increased polarity for use with the method, said adhesives being more acceptable of radio frequency energy than unmodified isocyanates.

It is a further object to provide a method in which the pressing times and temperatures for composite wood products are significantly reduced.

These and many other objects will become readily apparent upon reading the following detailed description taken in conjunction with the drawings.

DETAILED DESCRIPTION OF THE PREFERRED EMBODIMENTS

Figure 1:
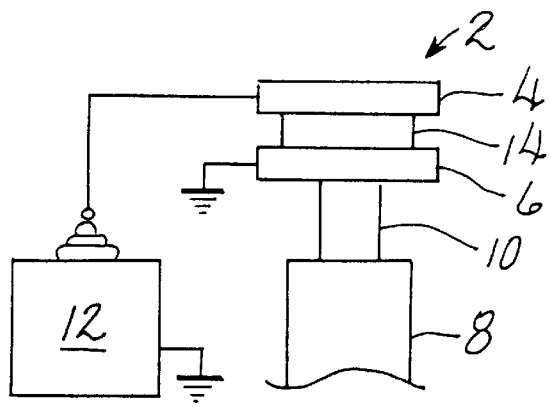
FIG. 1 is a diagrammatic illustration of a press arrangement using both radio frequency and conventional heat.

Wood for bonding trials was western hemlock rotary cut veneer with a thickness of ¹⁄₁₀ inch (2.5 mm) and dried to a moisture content of about 6%. Unless otherwise described, 2×2 ft (0.61×0.61 m) plies were coated on each side with adhesive with a total adhesive usage of about 6% based on as is wood weight. Twenty five plies were assembled and placed in a hydraulic press having a platen area of 4×4 feet (1.22×1.22 m) and a ram area of 0.40 m$^2$. The press was insulated to work in concert with a Thermex® Model T20-CD2 radio frequency generator having a maximum power output of 20 kw at 20 MHz. The RF generator is available from Thermatron, Bay Shore, N.Y. Other suppliers offer similar and equally suitable equipment. The press was equipped with oak stops to achieve a wood compression of about 20% or 40%. The pressing setup is illustrated in FIG. 1 where the press is generally identified at 2. This has an insulated fixed upper platen 4 and a grounded moveable lower platen 6. The platens are heated with steam or oil, not shown. A hydraulic cylinder 8 has a ram 10 that drives the lower platen. Output of an RF generator 12 is connected to the upper platen. The material 14 being pressed is located between the platens and may be heated during pressing by conductive heat from the platens, by RF dielectric heating, or by a combination of both methods.

EXAMPLE 1

A scoping trial was made by slotting the center three plies of a 25 ply hemlock veneer assembly with a kerf 10 mm wide for a distance of about 20 cm to allow insertion of a fiber optic thermocouple probe. Plies 11 and 12 were coated on the tight side of the veneer with a PMDI adhesive, Rubinate® 1840, available from ICI Americas, West Deptford, N.J., as received from the manufacturer. Plies 14 and 15 were similarly coated with the PMDI modified by adding 20% by weight propylene carbonate (PC). The center ply (ply 13) was uncoated as were all of the other plies in the assembly. The glue lines were oriented so that they faced ply 13. Thus ply 13 would have a glue line of each composition in contact with it on opposite sides. The adhesives were applied by brush with a 7–8% usage by weight. The press platens were heated to 110° C. and the press was closed to 1.5 inch (38 mm) stops while applying RF energy at a power level of 12 kw at 20 MHz. Ram pressure was 800–900 psi (5520–6200 kPa) resulting in a pressure on the assembly in the range between 5900–6630 kPa. From the initial 25° C. starting temperature of the assembly, the interior temperature had increased to 48° C. in 2 min, and 62° C. in 3 min at which time the platens had reached the stops. The interior temperature continued upward reaching 80° C. in 4.6 minutes and 110° C. in 8 minutes. At this time the application of RF energy was terminated and the press opened. The veneer sheets coated with the unmodified PMDI adhesive had no bond but those with the PMDI-PC mixture showed excellent bonding.

Figure 2:
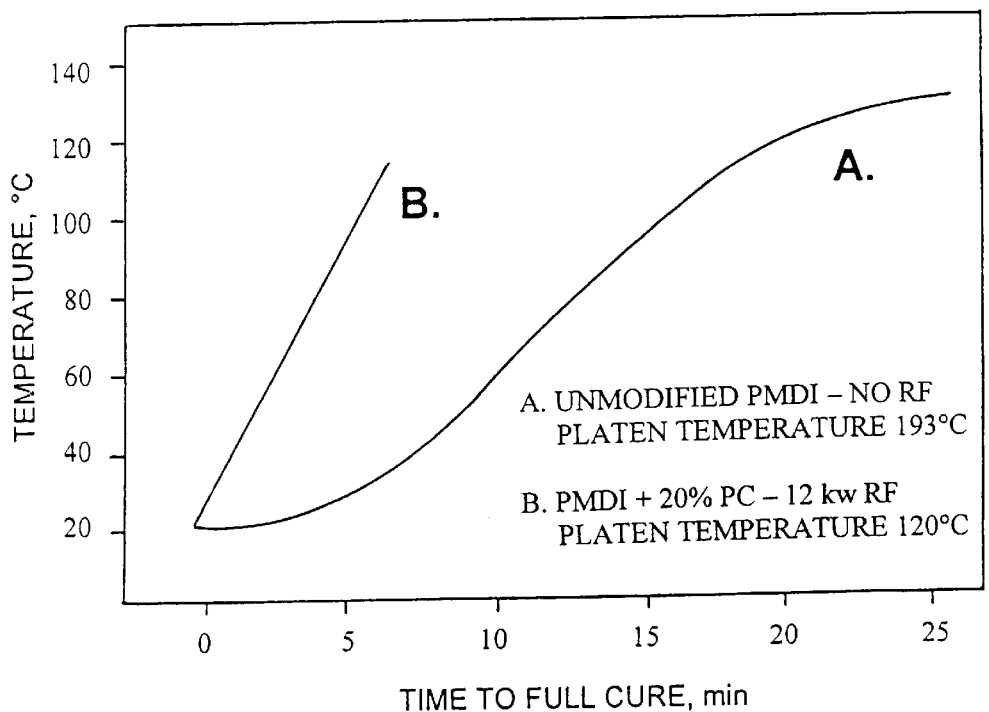
FIG. 2 is a graph indicating cure rates of unmodified resin with conventional heating and modified resin using supplemental radio frequency heat.

Cure rate tests were conducted using unmodified PMDI with only conductive heat and PMDI with 20% propylene carbonate (PC) using a combination of conductive platen heat and RF heat. Sample constructions were as described above. Platen temperature for the tests with the unmodified resin was 193° C. while a temperature of 120° C. was used for the modified resin samples. Results of these tests are shown in FIG. 2. The unmodified resin samples did not reach full cure for 25 minutes at which time the interior temperature had reached 130° C. In contrast, the samples with propylene carbonate modified resin and RF heating reached a full cure in about 6 minutes at an internal temperature of about 120° C. The increase in rate of temperature rise with the sample using RF and propylene carbonate modified PMDI was quite dramatic.

EXAMPLE 2

A test of similar configuration to that of Example 1 was made using significantly reduced glue spread. Usage of the propylene carbonate modified PMDI was reduced to 4.8% by weight on ply 14 and 6.2% on ply 15. The unmodified PMDI usage was 5% on ply 11 and 5.5% on ply 12. The press was closed to the 38 mm stops in 100 seconds with a ram pressure of 6550 kPa. Radio frequency energy was applied as before. Platen temperature was 110° C. The interior temperature had reached 115° C. at 7.8 minutes at which time the RF power was shut off. The temperature had increased to 118° C. at 10.4 minutes at which time the press was opened. Bond with the unmodified (or neat) resin was still very weak whereas a very strong bond was obtained with the propylene carbonate modified PMDI. Internal bond tests were made on the respective gluelines. A value of only 690 kPa was obtained on the gluelines with unmodified PMDI whereas values of 2410 to 3450 kPa were noted on the modified PMDI gluelines.

EXAMPLE 3

In this example all plies were treated with spray gun applied PMDI modified with 20% propylene carbonate, total resin usage averaging about 4.6% by weight. With the exception of the outside plies, all other plies were coated on both sides. Platen temperature was 120° C. and RF power usage was as in the earlier examples. Press closing was extended to 5 minutes and ram pressure was reduced from 6550 kPa to 2760 kPa when the 38 mm stops were reached. The RF energy was shut off at 7.8 minutes and the press opened at 10.5 minutes. Due to damage to the thermocouple no temperatures were recorded. The resulting 25 ply panel had excellent bonding.

EXAMPLE 4

A series of tests were made using western hemlock veneers 2×2 ft (0.61×0.61 m) in dimensions. Resin usage was 6±½% based on as is weight of the veneers. All veneer sheets except those on the outside were coated on both sides. Radio frequency energy usage was again 12 kw. Samples 38 mm in thickness compressed 40% were assembled from 25 sheets of veneer as in the previous examples. A second group of samples pressed to this thickness was made with about 20% compression using 19 sheets of veneer. An additional group of samples was made to 19 mm (0.75 inch) thickness at about 20% compression using 10 sheets of veneer. Platen temperatures in all cases was 120° C. Adhesive usage was unmodified PMDI and PMDI modified with 12.5% and 20% propylene carbonate. Results of this test series are seen in Table 1.

TABLE 1

| Densification, % | Final Temp. ° C. | Thickness, in | RF Off, min | Press open, min | Comments |
|---|---|---|---|---|---|
| Unmodified PMDI | | | | | |
| 40 | 135 | 1.5 | 9:09 | 10:09 | blow - delam. |
| 20 | 135 | 1.5 | 8:30 | 9:30 | good |
| 20 | 120 | 1.5 | 7:28 | 8:28 | delam. |
| 20 | 142 | 0.75 | 3:35 | 8:00 | poor cure |
| PMDI with 12.5% Propylene Carbonate | | | | | |
| 40 | 142 | 1.5 | 7:56 | 9:56 | good |
| 20 | 134 | 1.5 | 8:00 | 10:00 | good |
| 20 | 120 | 1.5 | 6:16 | 8:16 | Delam. |
| 20 | 136 | 0.75 | 8:46 | 10:46 | good |
| PMDI with 20% Propylene Carbonate | | | | | |
| 40 | 140 | 1.5 | 8:09 | 10:09 | good |
| 20 | 136 | 1.5 | 8:06 | 10:06 | good |
| 20 | 123 | 1.5 | 6:10 | 8:10 | good |
| 20 | 136 | 0.75 | 5:30 | 7:30 | good |

Reference to the above will readily show the advantage of using the propylene carbonate modified PMDI resin. Even at the reduced 12.5% usage, good panels were obtained with the single exception of those using a shortened time period with resulting lower internal panel temperature. In contrast, only one good panel set was obtained with the unmodified resin.

EXAMPLE 4

Representative samples from the above test series were prepared under conditions that would assure full cure of the resin. Radio frequency energy was used in conjunction with heated platens for all samples. The procedure used was similar to that of Example 3 with adhesive usage being about 6±½%. Tests of panel stiffness at minimum cure times gave the following results.

TABLE 2

| Adhesive | Temperature, ° C. | Press Time, min | MOE, kPa × $10^7$ |
|---|---|---|---|
| Neat PMDI | 139 | 12:00 | 1.26 |
| 12.5% PC | 130 | 10:46 | 1.28 |
| 20% PC | 130 | 7:30 | 1.23 |

The significant reduction in press time, without appreciable difference in stiffness, is readily apparent. With 20% propylene carbonate usage, the press cycle was reduced by over ⅓ compared with that using unmodified PMDI.

The use of polar modifiers having mutual solubility in the isocyanate resins and water have now made the use of radio frequency curing practical for isocyanate wood adhesives.

While described here, the advantages in press time reduction without loss of strength have been found equally significant when other types of reconstituted wood products have been manufactured. It should thus be apparent to those skilled in the art that many variations could be made from those exemplified without departing from the spirit of the invention. These variations should be considered to be within the scope of the invention if encompassed within the following claims.

We claim:

1. A method for bonding composite wood products which comprises;

providing a plurality of wood pieces to be bonded;

applying a crosslinking-type adhesive to the wood pieces wherein the adhesive consists essentially of a mixture of a monomeric diisocyanate and oligomers of the diisocyanate in combination with a compound selected from the group consisting of lower alkylene carbonates and triacetin;

combining the adhesive coated wood pieces into a preform;

applying pressure to the preform to form it into the ultimate product shape and density while simultaneously applying sufficient conductive heat and radio frequency energy to the pressed preform to achieve at least a partial cure of the adhesive so as to bond the wood pieces, sufficient radio frequency energy being applied to reduce cure time to achieve a handleable product to less than about 80% of the time required when thermal energy alone is applied at the same temperature; and removing the pressure from the bonded product.

2. The method of claim 1 in which the diisocyanate is a mixture of 4,4'-diphenylmethane diisocyanate and oligomers thereof.

3. The method of claim 1 in which the alkykene carbonate is selected from the group consisting of ethylene carbonate, propylene carbonate, butylene carbonate, and mixtures thereof.

4. The method of claim 3 in which the alkylene carbonate is propylene carbonate.

5. The method of claim 2 in which the alkylene carbonate is present in the range of 5–25% by weight of the diisocyanate.

6. The method of claim 4 in which the alkylene carbonate is present in the range of 5–25% by weight of the diisocyanate.

7. The method of claim 1 in which the wood pieces are flakes and the product is a flakeboard.

8. The method of claim 1 in which the wood pieces are elongated strands and the product is an oriented strand board.

9. The method of claim 1 in which the wood pieces are veneers.

10. The method of claim 9 in which the bonded veneers are further formed into laminated veneer lumber.

11. The method of claim 1 in which the wood pieces are strips of predefined width and the strips are assembled into composite lumber products.

12. The method of claim 1 in which the pressure is applied by a platentype press and the platen temperature during pressing is in the range of 100°–140° C.

13. The method of claim 12 in which the platen temperature is about 110°–130° C.

14. The method of claim 1 in which the pressure is applied by a continuous press and the applied temperature is in the range of 100°–140° C.

15. The method of claim 14 in which the applied temperature is about 110°–130° C.

16. The method of claim 1 in which sufficient radio frequency energy is applied to achieve a cure time of less than about 6 minutes for a product of about 38 mm (1½ inches) in thickness at a pressing temperature in the range of 110°–130° C.

17. A method for bonding composite wood products which comprises:

providing a plurality of wood pieces to be bonded;

applying a crosslinking-type adhesive to the wood pieces wherein the adhesive is a mixture of a monomeric diisocyanate and oligomers of the diisocyanate in combination with an adhesive modifier selected from the group consisting of lower alkylene carbonates and triacetin;

combining the adhesive coated wood pieces into a preform;

applying pressure to the preform to form it into the ultimate product shape and density while simultaneously applying sufficient conductive heat and radio frequency energy to the pressed preform to achieve at least a partial cure of the adhesive so as to bond the wood pieces, a sufficient amount of the adhesive modifier being used to increase the radio frequency susceptibility of the diisocyanate and a sufficient amount of radio frequency energy being applied to reduce cure time to achieve a handleable product to less than about 80% of the time required when thermal energy alone is applied at the same temperature; and removing the pressure form the bonded product.

18. The method of claim 17 in which the diisocyanate is a mixture of 4,4'-diphenylmethane diisocyanate and oligomers thereof.

19. The method of claim 17 in which the alkylene carbonate is selected from the group consisting of ethylene carbonate, propylene carbonate, butylene carbonate, and mixtures thereof.

20. The method of claim 17 in which the wood pieces are flakes or strands and the product is a wood composite board.

21. The method of claim 17 in which the wood pieces are veneers and the product is a laminated veneer lumber.

* * * * *